(12) United States Patent
Tuan

(10) Patent No.: US 10,948,742 B2
(45) Date of Patent: Mar. 16, 2021

(54) NON-CIRCULAR CONTACT LENSES WITH PAYLOADS

(71) Applicant: Tectus Corporation, Saratoga, CA (US)

(72) Inventor: Kuang-mon Ashley Tuan, Mountain View, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 16/810,709

(22) Filed: Mar. 5, 2020

(65) Prior Publication Data

US 2020/0201072 A1    Jun. 25, 2020

Related U.S. Application Data

(63) Continuation of application No. 15/955,844, filed on Apr. 18, 2018, now Pat. No. 10,620,455.

(51) Int. Cl.
  *G06F 3/01* (2006.01)
  *G02C 7/04* (2006.01)
  *H04N 13/344* (2018.01)
  *G09G 3/02* (2006.01)
  *G02B 27/00* (2006.01)

(52) U.S. Cl.
  CPC ........... *G02C 7/04* (2013.01); *G02B 27/0093* (2013.01); *G06F 3/013* (2013.01); *G09G 3/02* (2013.01); *H04N 13/344* (2018.05)

(58) Field of Classification Search
  None
  See application file for complete search history.

(56) References Cited

U.S. PATENT DOCUMENTS

| 2,264,080 | A |   | 11/1941 | Hunter |
|---|---|---|---|---|
| 4,640,595 | A |   | 2/1987 | Volk |
| 5,062,701 | A |   | 11/1991 | Drazba |
| 5,570,142 | A | * | 10/1996 | Lieberman ............ G02C 7/047 351/159.02 |
| 5,760,870 | A |   | 6/1998 | Payor |
| 5,880,809 | A |   | 3/1999 | Lieberman |
| 8,888,277 | B2 |   | 11/2014 | Jubin |
| 9,414,906 | B2 |   | 8/2016 | Blum |

(Continued)

OTHER PUBLICATIONS

Eaglet Eye, "The ESP—Eye Surface Profiler," 2018, 3 pages, [Online][Retrieved Aug. 24, 2018], Retrieved from the Internet <URL:http://eaglet-eye.com/the-esp/>.

(Continued)

*Primary Examiner* — Parul H Gupta
(74) *Attorney, Agent, or Firm* — Fenwick & West LLP

(57) ABSTRACT

An eye-mounted display includes a scleral contact lens with one or more femtoprojectors that project images onto the user's retina. The scleral contact lens has a non-circular perimeter, for example elongated along the direction of the eye opening. The non-circular shape can result in less slippage and/or rotation of the contact lens relative to the eye. If the contact lens is elongated (compared to traditional circular lenses), then it can contain conductive coils that enclose a larger area. Thus, the lens increases coupling efficiency for power or data transfer. There can also be more space within the contact lens for payloads.

20 Claims, 4 Drawing Sheets

(56) References Cited

U.S. PATENT DOCUMENTS

| | | | |
|---|---|---|---|
| 2004/0027536 A1* | 2/2004 | Blum | G02C 7/08 |
| | | | 351/159.03 |
| 2005/0168688 A1* | 8/2005 | Doshi | G02C 7/108 |
| | | | 351/159.32 |
| 2006/0268225 A1* | 11/2006 | Lieberman | G02C 7/04 |
| | | | 351/159.74 |
| 2009/0189830 A1* | 7/2009 | Deering | H04N 13/383 |
| | | | 345/1.3 |
| 2013/0211515 A1* | 8/2013 | Blum | A61F 2/1637 |
| | | | 623/6.22 |
| 2015/0312560 A1 | 10/2015 | Deering | |
| 2016/0223842 A1 | 8/2016 | Yun | |
| 2018/0017811 A1* | 1/2018 | Perozziello | B29D 11/00826 |
| 2018/0017813 A1* | 1/2018 | Perozziello | H05K 1/181 |
| 2018/0036974 A1 | 2/2018 | Hahn | |
| 2018/0316224 A1* | 11/2018 | Maynard | G02C 7/083 |
| 2019/0245523 A1* | 8/2019 | Lemoff | H03J 9/02 |

OTHER PUBLICATIONS

EyePrint Prosthetics, "EyePrintPRO™ is HOPE," 2017, 5 pages [Online] [Retrieved Aug. 24, 2018], Retrieved from the Internet <URL:http://www.eyeprintpro.com>.

EyePrint Prosthetics, "The Science Behind EyePrintPRO™," 2017, 3 pages [Online] [Retrieved Aug. 24, 2018], Retrieved from the Internet <URL:http://www.eyeprintpro.com/our-science>.

Hall, L. et al., "What You Need to Know about Sagittal Height and Scleral Lenses," Contact Lens Spectrum, May 1, 2015, 5 pages, vol. 30.

Jesus, D.A. et al., "Precise Measurement of Scleral Radius Using Anterior Eye Profilometry," Contact Lens and Anterior Eye, 2016, 6 pages.

\* cited by examiner

NON-CIRCULAR CONTACT LENSES WITH PAYLOADS

CROSS REFERENCE TO RELATED APPLICATIONS

This application is a continuation of U.S. application Ser. No. 15/955,844, filed Apr. 18, 2018, now U.S. Pat. No. 10,620,455, which is incorporated by reference in its entirety.

BACKGROUND

1. Technical Field

This disclosure relates generally to contact lenses with payloads, including for example eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the contact lens. The projector must be very small to fit in the contact lens, so small that Deering called it a "femtoprojector." A typical femtoprojector preferably is no larger than about one or two millimeters in any dimension.

Each femtoprojector in an eye-mounted display includes an image source and an optical system. A femtoprojector's optical system is designed to project images from the image source onto the retina so that the images appear in a person's field of vision. The femtoprojector optical systems are constrained to fit inside a contact lens while also providing appropriate magnification and sufficient image quality.

Eye-mounted displays can be used for virtual reality applications and also for augmented reality applications. In virtual reality applications, the images projected by the eye-mounted display replace what the user would normally see as his external environment. In augmented reality applications, the images projected by the eye-mounted display augment what the user would normally see as his external environment, for example they may appear as additions to the external environment. In both cases, it is usually important to project the images onto the user's retina with fairly high positional accuracy.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Contact lens devices that perform functions beyond just fixed vision correction may carry payloads in the contact lens, including electronic payloads. For example, an eye-mounted display may be based on a contact lens that contains one or more femtoprojectors and corresponding electronics. These displays project images onto the user's retina, which can provide an augmented reality and/or virtual reality to the user. There are many design challenges for such a device. For example, it is desirable to reduce or eliminate movement of the contact lens relative to the eye. If the contact lens slips or rotates on the eye, then the position of femtoprojector(s) in the contact lens will change relative to the retina. Mechanisms to compensate for this movement can make the overall system unnecessarily complex. Other challenges include efficiently transferring power and data to the contact lens and providing enough space within the contact lens for the electronic and other payload components.

In one approach, a scleral contact lens with a non-circular perimeter is used. A scleral contact lens rests on the sclera (i.e., the white part) of a user's eye. Elongating the scleral contact lens along the direction of the eye opening can result in a better fit between the contact lens and the eye. The elongated shape of the contact lens increases the area of contact between the contact lens and the user's sclera, thus reducing slippage and/or rotation of the contact lens relative to the eye. The interior surface of the scleral contact lens (i.e., the part contacting the sclera) can also be customized to match the contour of the user's eye, thus allowing a better fit between the contact lens and the user's sclera and further reducing contact lens movement relative to the eye. The non-circular shape also results in a larger perimeter, which can be used to accommodate conductive coils with a larger area, thus increasing coupling efficiency for power or data transfer. The non-circular lens can also provide more space within the contact lens for payloads.

Figure 1A:
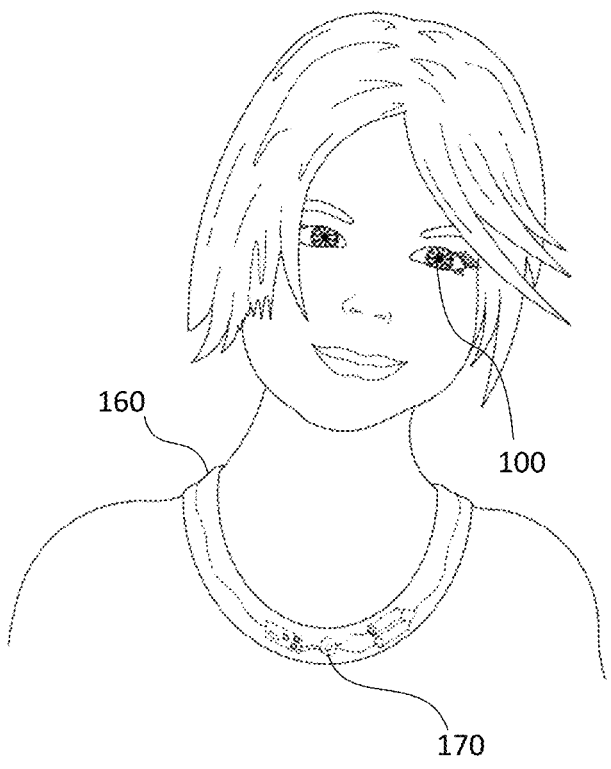
FIG. 1A shows a user wearing an eye-mounted display in communication with an auxiliary necklace.
Figure 1B:
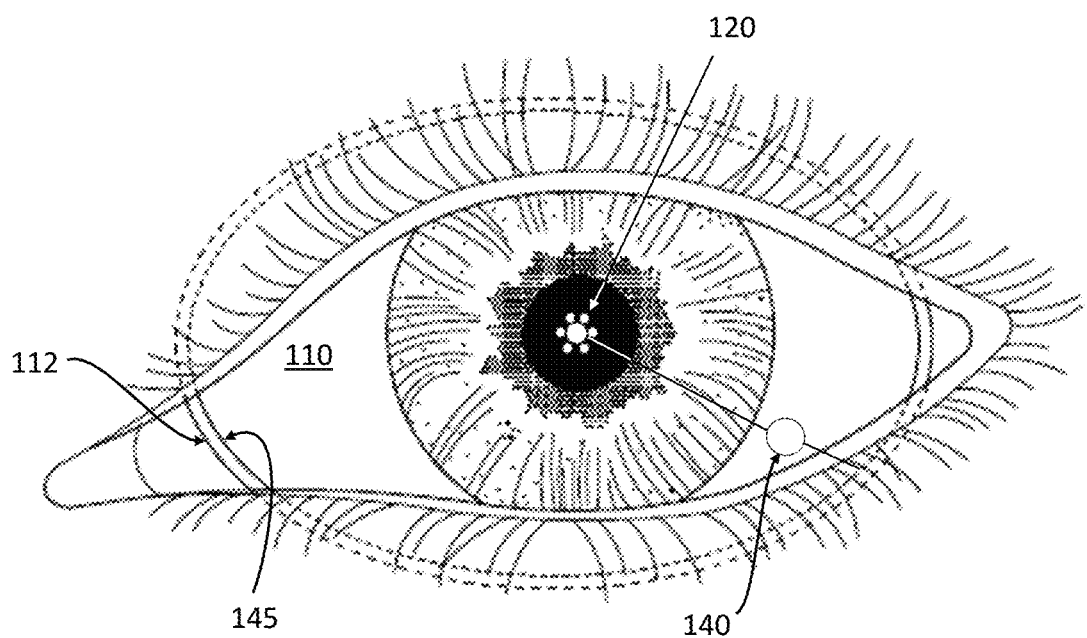
FIG. 1B shows a magnified view of the eye-mounted display mounted on the user's eye.

In more detail, FIG. 1A shows a user wearing an eye-mounted display 100 in communication with a necklace 160. FIG. 1B shows a magnified view of the user's eye and eye-mounted display 100. The eye-mounted display 100 includes a contact lens 110. The following examples use a scleral contact lens but the contact lens does not have to be scleral. The contact lens 110 has a non-circular perimeter 112 and extends below the upper and lower eyelids. In this example, the contact lens 110 has an "oval" perimeter 112 that is elongated along the direction of the eye opening. Due to the curvature of the eye, the actual shape of the perimeter is three-dimensional. However, for convenience, it will be referred to as oval if the two-dimensional projection onto a plane is oval. Due to the size of the contact lens 110, it is partially covered by the user's eyelids.

The contact lens 110 also contains multiple femtoprojectors 120, each represented by a white circle in FIG. 1B. The femtoprojectors 120 project images onto the user's retina.

The contact lens 110 moves with the user's eye 100 as the user's eye rotates in its socket. Because the femtoprojectors 120 are mounted in the contact lens 110, they also move with the user's eye. Some femtoprojector(s) may always project images to the fovea, and other femtoprojector(s) may always project images to more peripheral regions which have lower resolutions.

In this example, the contact lens 110 also contains electronics 140 and a conductive coil 145. The coil 145 may be used to wirelessly transmit and/or receive power and/or data, for example via induction. To increase coupling to the coil 145, it is desirable to increase the area enclosed by the coil. In this example, because the contact lens 110 is elongated, the conductive coil 145 has a larger area than would be the case for a conventional contact lens with a circular perimeter. To increase the area enclosed by the coil 145, the coil may be located near the perimeter 112 and have a similar shape as the perimeter 112, as shown in FIG. 1B. For example, the conductive coil 145 may be constructed so that it lies parallel to and within 0.3 mm to 3 mm of the perimeter 112 (e.g., the coil 145 lies within 2 mm of the perimeter 112).

In other embodiments, the contact lens 110 includes a battery that supplies power to the femtoprojectors 120. The electronics 140 may be used to control the femtoprojectors, receive or process images from the femtoprojectors, provide power to the femtoprojectors, and/or transmit data to/from the femtoprojectors. The contact lens 110 may also include other components.

FIG. 1A shows an implementation where, in addition to the eye-mounted display 100, the user is also wearing a necklace 160 that contains components of the eye-mounted display system. In this example, the necklace 160 includes a wireless transmitter 170 that transmits image data and/or power to the eye-mounted display 100. For an eye-mounted display, reducing the data transmission rate is desirable, both because the available bandwidth is limited and because it is desirable to reduce the complexity and power consumption of electronics in the contact lens.

Figure 2A:
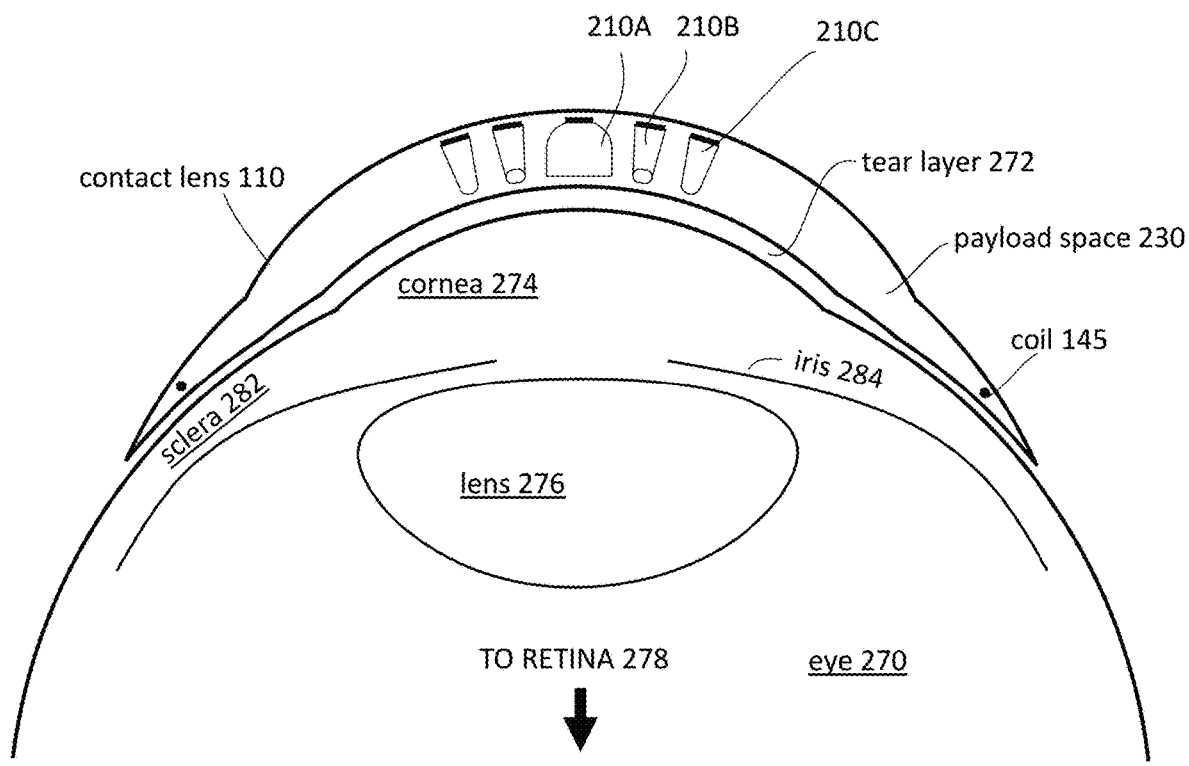
FIG. 2A shows a cross sectional view of an eye-mounted display containing multiple femtoprojectors in a contact lens.
Figure 2B:
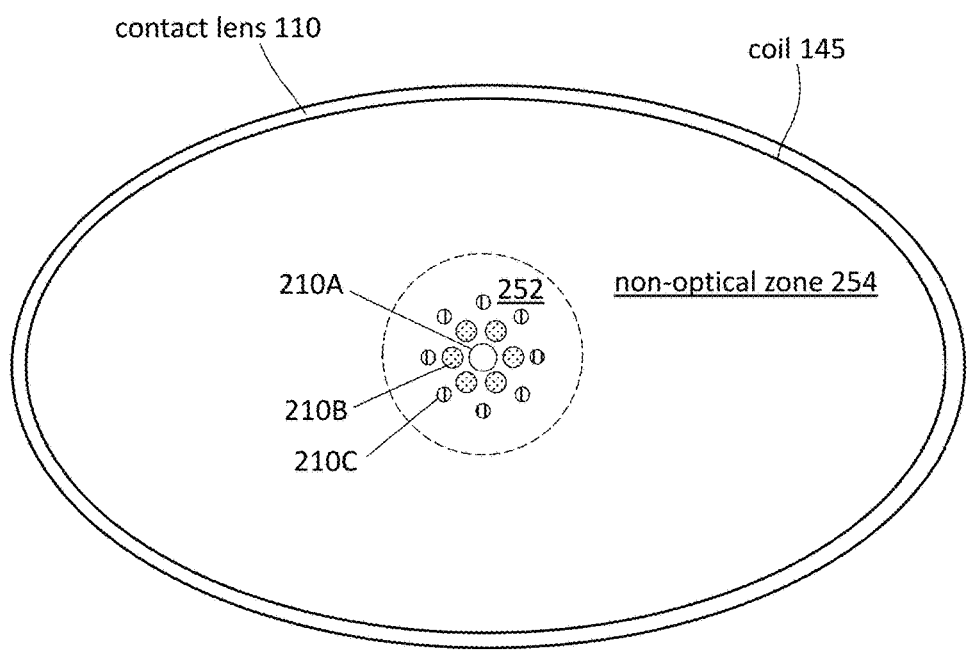
FIG. 2B shows a front view of an eye-mounted display containing multiple femtoprojectors in a contact lens.

FIG. 2A shows a cross sectional view of an eye-mounted display containing femtoprojectors 210 in a scleral contact lens 110. FIG. 2B shows a top view, i.e., a view looking at the user's eye. In this example, there are three types of femtoprojectors 210A, 210B, and 210C, which have different optical designs depending on the desired resolution and magnification. The retinal receptive fields are more densely packed towards the fovea and become progressively less densely packed away from the fovea. Accordingly, in one implementation, femtoprojectors that project to the fovea generate higher resolution images on the retina, and those that project to the periphery of the retina generate correspondingly lower resolution images.

The contact lens 110 is separated from the cornea 274 of the user's eye 270 by a tear layer 272. Over the cornea 274, the tear layer 272 may be as thick as a hundred microns or more while it may be only a few microns thick over the sclera 282. The aqueous of the eyeball is located between the cornea 274 and the crystalline lens 276 of the eye. The vitreous fills most of the eyeball including the volume between the crystalline lens 276 and the retina 278. The iris 284 limits the aperture of the eye.

The contact lens 110 preferably has a thickness that is less than 2 mm, and the femtoprojectors 210 each preferably fits in a 2 mm by 2 mm by 2 mm volume, or less. The contact lens 110 should be comfortable to wear and maintains eye health by permitting oxygen to reach the cornea 274. In some designs, the optical paths from the image sources in the femtoprojectors 210 to the retina 278 do not include any air gaps, although that is not required.

In FIG. 2B, the contact lens 110 is roughly divided by the dashed circle into an optical zone 252 and a non-optical zone 254. Components in the optical zone 252 may be in the optical path of the eye, depending on how far open the pupil is. Components in the non-optical zone 254 fall outside the aperture of the eye. In addition to the femtoprojectors 210, the contact lens may also contain other components for data transmission, power, and/or positioning. Data transmission components may include antennae or optical/infrared photodetectors, data storage and buffering, controls, and on-lens processing. Power components may include coils for power transmission and batteries for power storage. Positioning components may include accelerometers, gyroscopes, or other structures used for eye tracking and head tracking.

The use of a larger contact lens 110 can create more space 230 for components in the contact lens. In addition, the contact lens and its components can be colored to make them less visible to outside observers. For example, components that are positioned in front of the iris 284 can be made opaque with a color that matches the user's eye. Components that are in front of the sclera 282 may be given a white appearance or otherwise match the sclera. This allows components and the contact lens 100 to be less visible.

In addition to the eye-mounted display, the overall system may also include a head tracker, eye tracker, and scaler. The system receives input images (including possibly video), which are to be displayed to the human user via the eye-mounted display. The femtoprojectors 210 project the images on the user's retina, thus creating an image of virtual objects in the user's field of view. The scaler receives the input images and produces the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace, or other types of packs. FIG. 1A shows an example where some functionality is implemented in a necklace 160 worn by the user.

Figure 3:
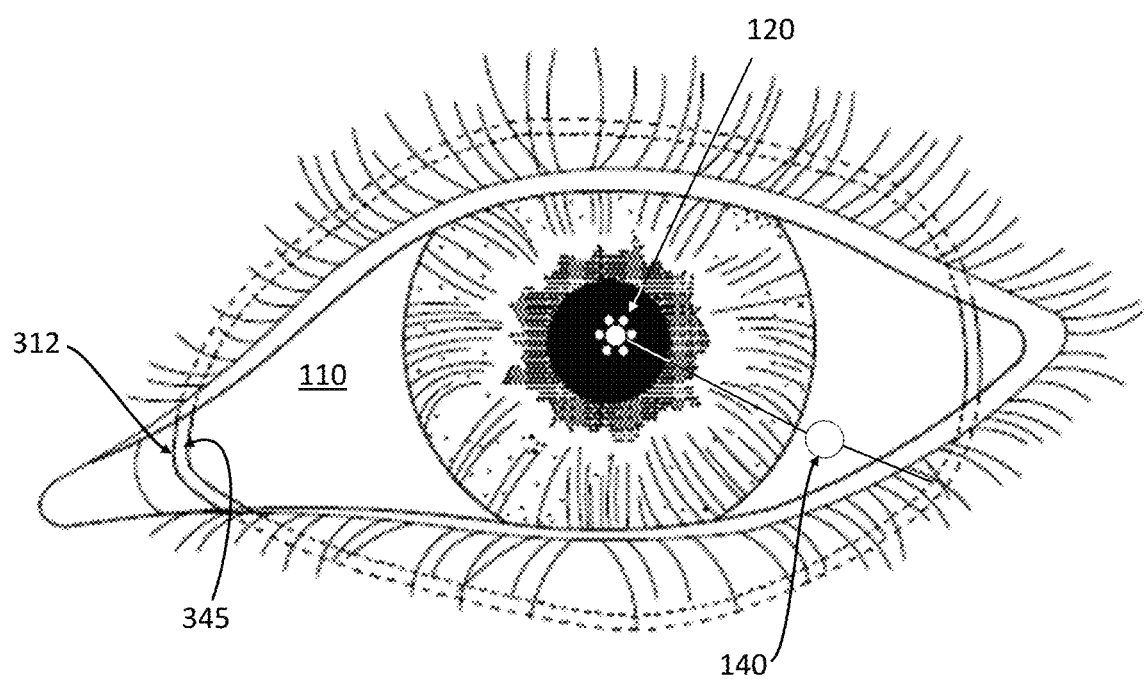
FIG. 3 shows another eye-mounted display mounted on the user's eye.

The scleral contact lenses 110 can take various shapes, not just circular and oval. FIG. 3 shows another eye-mounted display mounted on the user's eye, where the perimeter 312 of the contact lens 110 has an irregular shape. The contact lens also contains a set of femtoprojector(s) 120, various other components 140, and a conductive coil 345. In the drawing, the coil 345 follows the outline of the perimeter 312, but it is not required to do so. For example, it may be more rounded to reduce corners in the conductive coil 345.

Figure 4A:
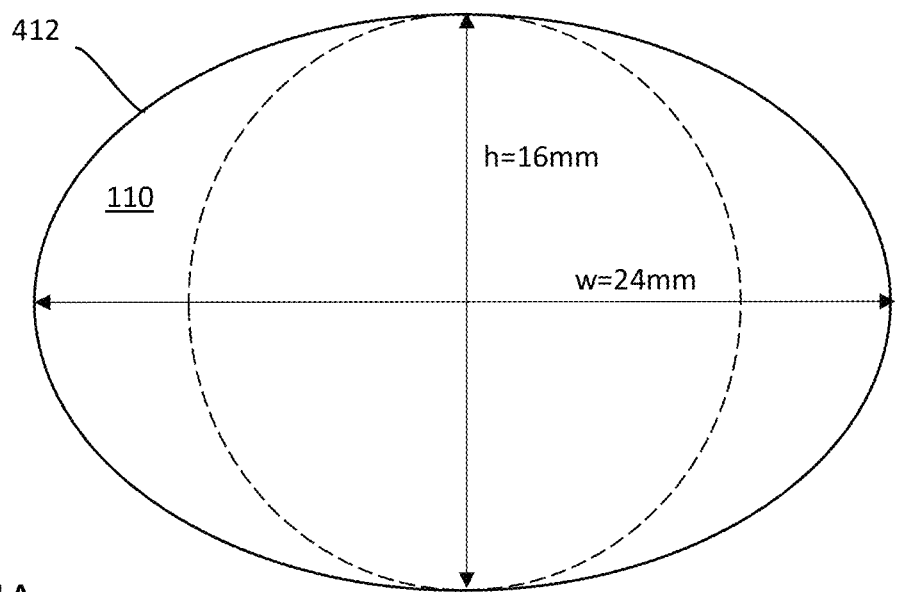
FIGS. 4A and 4B show oval and irregular perimeters of contact lenses, respectively.
Figure 4B:
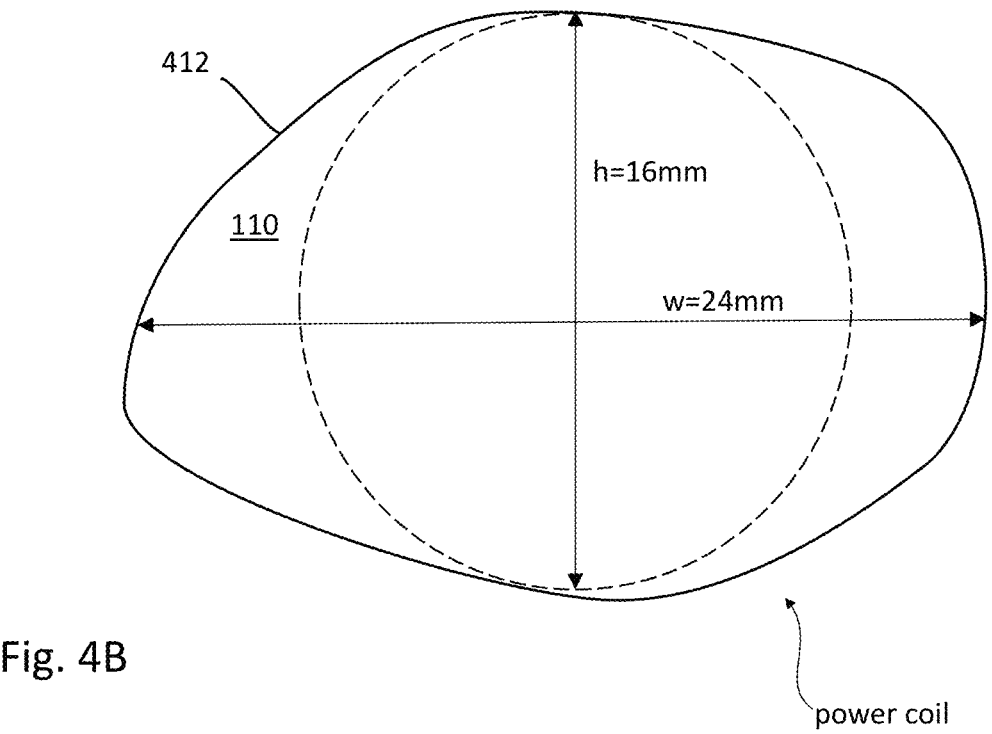

FIGS. 4A and 4B show the perimeters 412 of the contact lenses 110 of FIGS. 1B and 3, respectively. The dashed line shows an inscribed circle. The sizes of the contact lenses 110 can be described by their width "w" and height "h." The height and width are equal for a circular contact lens. As seen in FIGS. 4A and 4B the width can be larger than the height. In the examples shown, w=24 mm and h=16 mm, for a w/h ratio=1.5. In some embodiments, the width w is between 10 mm and 30 mm and, similarly, the height h is between 10 mm and 30 mm. For example, the height h of the contact lens is at least 11 mm. In another example, the width of the contact lens is at least 20 mm. In some embodiments, the perimeter 412 of the non-circular contact lens 100 has an enclosed area between 80 mm$^2$ and 800 mm$^2$. In some embodiments, the shape of the perimeter 412 depends on available eye contour information.

In both FIGS. 4A and 4B, a conductive coil that follows the non-circular perimeter 412 of the contact lens 110 will enclose a larger area than a circular conductive coil that would also fit within the contact lens 110. This larger area compared to a circular contact lens can result in more power transferred to the conductive coil, because voltage is proportional to the area and power is proportional to the square of the voltage. For example, consider FIG. 4A. Assume the coil is 1 mm away from the perimeter. For a circular contact lens with a diameter of 16 mm, the conductive coil will have a diameter of 14 mm and an area of 154 mm$^2$. The conductive coil for the elliptical contact lens in FIG. 4A has major and minor axes of 22 mm and 14 mm, respectively. The enclosed area is 242 mm$^2$, or about 60% greater induced voltage and about 150% more power than the circular contact lens.

A non-circular scleral contact lens 110 with an increased footprint can also be designed to include larger interior spaces for payloads (such as payload space 230 in FIG. 2A), compared to a conventional circular contact lens. As a result, larger payloads or more payloads may be contained in the contact lens. In some designs, the payload space has a thickness of 1 mm or more (e.g., a thickness of at least 0.2 mm over an area of at least 10 mm$^2$). Alternately, the payload space can have a volume of 300 mm$^3$ or more (e.g., a volume of at least 1 mm$^3$).

Generally, the more scleral area that a lens covers and/or matches, the greater the lens stability and user comfort. Thus, in some implementations, non-circular contact lenses 110 are customized to increase the contact area with and/or to better fit the contour of a user's eye 120. As such, the contact lens 110 may be aspheric and asymmetric. In some cases, a contact lens 110 is customized to increase the contact area with the user's sclera, for example by better matching the shape of the user's eye opening. In other cases, a contact lens 110 is customized to better match the interior surface of the contact lens to the contour of the eye. The interior surface of the contact lens 110 can be designed to grip the outside surface of the eye. These embodiments can further reduce contact lens 110 movement and rotation, resulting in increased positional stability of the contact lens and projected image relative to the eye.

To obtain a customized contact lens 100, the contour of a user's eye may be measured. Techniques that measure the contour of the sclera may be advantageous because the contour information of the sclera (e.g., the area adjacent to the cornea) may be used to generate a well-fitting lens. For example, to enhance stability, the contact area between the contact lens and sclera may be at least 3 mm wide. Therefore, to design a customized contact lens, careful measurements of the sclera, and possibly a combination of multiple measurements of the sclera, may be used to construct a three-dimensional contour of the eye.

The contour of a user's eye can be measured using direct molding or by using structured light scanning, among other techniques. In direct molding, a mold of the user's eye contour is created by impressing the mold material directly onto the user's eye. The mold captures the contour of the eye and can be digitized (e.g., by scanning) to capture the relevant three-dimensional information. In structured light scanning, patterned light is projected onto the user's eye. The contour of the eye causes variations in the light pattern. These variations can be captured and then used to reconstruct a three-dimensional contour of the eye.

The contact lenses 110 themselves can be shaped using a diamond lathe. The lathe can be equipped with multiple axes that are synchronized to spindle rotation in order to cut a customized asymmetric lens shape. For example, the lathe is a two axis continuous path contouring and edging lathe that directly machines the contact lenses.

The lens design can be carried out by a trained professional using the available three-dimensional eye contour information (e.g., from direct molding, structured light scanning or other types of optical topography). The lens shape can be non-circular and can be determined based on the available eye contour information. The interior surface of the contact lens can be shaped to fit the contour of the eye. In some cases, optical information relevant to the optical zone of the contact lens can be entered based on the user's needs (e.g., vision correction information). The final lens design can be generated based on this information and it can be reviewed by a trained professional before lens fabrication.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation, and details of the method and apparatus disclosed herein without departing from the spirit and scope as defined in the appended claims. Therefore, the scope of the invention should be determined by the appended claims and their legal equivalents.

What is claimed is:

1. An electronic contact lens system comprising:
   a scleral contact lens having an interior surface that rests on a sclera of a user's eye when the contact lens is mounted on the user's eye, the contact lens including an optical zone which is in an optical path of the user's eye, wherein:
   the contact lens extends beneath an eyelid of the user's eye when the user is wearing the contact lens;
   a two-dimensional projection of a perimeter of the contact lens onto a plane is non-circular, and a width of the contact lens is larger than a height of the contact lens; and
   an electronic payload mounted in the scleral contact lens, where the contact area of the interior surface with the sclera is large enough to reduce slippage and rotation of the contact lens relative to the user's eye sufficiently for operation of the electronic payload.

2. The electronic contact lens system of claim 1 where a width of the contact lens is at least 20 mm.

3. The electronic contact lens system of claim 1 where the two-dimensional projection of the perimeter of the contact lens encloses an area of at least 80 mm$^2$.

4. The electronic contact lens system of claim 1 where the electronic payload is mounted in an interior space of the contact lens, and the interior space has a thickness of at least 0.2 mm over an area of at least 10 mm$^2$ or has a volume of at least 1 mm$^3$.

5. The electronic contact lens system of claim 1 where the interior surface that rests on the sclera of the user's eye has a contact area with the sclera that is at least 3 mm wide at one part of the perimeter.

6. The electronic contact lens system of claim 1 where the interior surface of the contact lens is customized to fit a contour of the sclera of the user's eye.

7. The electronic contact lens system of claim 6 where a shape of the perimeter is customized to the user's eye.

8. The electronic contact lens system of claim 7 where the contact lens is customized based on an available contact area with the user's sclera.

9. The electronic contact lens system of claim 8 where the contact lens is customized based on a shape of the user's eye opening.

10. The electronic contact lens system of claim 6 where the contour of the sclera of the user's eye is measured by direct molding or structured light scanning, and the interior surface of the contact lens is customized based on the measured contour.

11. The electronic contact lens system of claim 10 where the contact lens is manufactured into a customized aspheric shape using a multi-axis lathe.

12. The electronic contact lens system of claim 1, where the electronic payload comprises a femtoprojector mounted in the optical zone of the scleral contact lens, the femtoprojector configured to project images onto a retina of the user's eye, and the contact area of the interior surface with the sclera is large enough to reduce slippage and rotation of the contact lens relative to the user's eye sufficiently to stabilize the projected images on the user's retina.

13. The electronic contact lens system of claim 1 where the electronic payload further comprises an electronic component mounted in a portion of the contact lens in front of the sclera and the electronic component is colored to match a coloring of the sclera.

14. The electronic contact lens system of claim 1 where the electronic payload further comprises an electronic component mounted in a portion of the contact lens in front of the sclera and the portion of the contact lens has an appearance that matches a coloring of the sclera and obscures the electronic component.

15. The electronic contact lens system of claim 1 where the contact lens is aspheric and asymmetric.

16. The electronic contact lens system of claim 1 where the two-dimensional projection of the perimeter of the contact lens has an oval shape.

17. The electronic contact lens system of claim 1 where the two-dimensional projection of the perimeter of the contact lens has an irregular shape.

18. The electronic contact lens system of claim 1 where the contact lens has a thickness less than 2 mm.

19. The electronic contact lens system of claim 1 further comprising a battery located in a non-optical zone of the contact lens and configured to power the electronic payload.

20. The electronic contact lens system of claim 1 where the electronic payload comprises an accelerometer and a gyroscope located in a non-optical zone of the contact lens, and the contact area of the interior surface with the sclera is large enough to reduce slippage and rotation of the contact lens relative to the user's eye sufficiently for operation of the accelerometer and the gyroscope relative to the user's eye.

\* \* \* \* \*